US007430284B2

(12) United States Patent
Dudley et al.

(10) Patent No.: US 7,430,284 B2
(45) Date of Patent: *Sep. 30, 2008

(54) ARCHITECTURE AND METHODS FOR INTER-CARRIER MULTI-MEDIA MESSAGING

(75) Inventors: William H. Dudley, Lovettsville, VA (US); Derek Hung Kit Tam, Reston, VA (US); James C. Farrow, Frederick, MD (US); Brian J. Beggerly, Washington, DC (US); Kirk Tsai, Potomac, MD (US); William Chu, Vienna, VA (US); Robert C. Lovell, Jr., Leesburg, VA (US)

(73) Assignee: Sybase 365, Inc., Chantilly, VA (US)

( * ) Notice: Subject to any disclaimer, the term of this patent is extended or adjusted under 35 U.S.C. 154(b) by 651 days.

This patent is subject to a terminal disclaimer.

(21) Appl. No.: 10/921,223

(22) Filed: Aug. 19, 2004

(65) Prior Publication Data
US 2006/0029192 A1 Feb. 9, 2006

(51) Int. Cl.
*H04M 11/06* (2006.01)
(52) U.S. Cl. .............................. 379/88.13; 379/112.07; 455/466; 455/456.3
(58) Field of Classification Search ................. 455/466, 455/456.3; 379/88.13, 112.07
See application file for complete search history.

(56) References Cited
U.S. PATENT DOCUMENTS 5,351,235 A 9/1994 Lahtinen

| | | |
|---|---|---|
| 5,621,727 A | 4/1997 | Vaudreuil |
| 5,768,509 A | 6/1998 | Gunluk |
| 5,887,249 A | 3/1999 | Schmid |
| 5,894,478 A | 4/1999 | Barzegar et al. |
| 6,021,126 A | 2/2000 | White et al. |
| 6,208,870 B1 | 3/2001 | Lorello et al. |
| 6,230,009 B1 | 5/2001 | Holmes et al. |
| 6,240,293 B1 | 5/2001 | Koster |
| 6,327,267 B1 | 12/2001 | Valentine et al. |
| 6,366,663 B1 | 4/2002 | Bauer et al. |
| 6,421,437 B1 | 7/2002 | Slutsman |
| 6,535,746 B1 | 3/2003 | Yu et al. |
| 6,560,226 B1 | 5/2003 | Torrey et al. |

(Continued)

FOREIGN PATENT DOCUMENTS

EP 0 777 394 A1 12/1995

(Continued)

OTHER PUBLICATIONS

PCT Notification of Transmittal of The International Search Report or the Declaration; PCT/US05/28031; International Filing Date Aug. 8, 2005; Applicant: Mobile 365; Mailed Mar. 9, 2006.

*Primary Examiner*—Gerald Gauthier
(74) *Attorney, Agent, or Firm*—Edell, Shapiro & Finnan, LLC

(57) ABSTRACT

Architecture and methods to provide an intermediary model for inter-carrier Multi-Media Messaging (MMS) services so that numerous wireless operators can transmit MMS messages between them. The architecture also provides for delivery, at least of notification messages, to those wireless operators who are not part of the overall inter-carrier MMS infrastructure.

15 Claims, 4 Drawing Sheets

U.S. PATENT DOCUMENTS

| | | |
|---|---|---|
| 6,594,254 B1 | 7/2003 | Kelly |
| 6,658,260 B2 | 12/2003 | Knotts |
| 6,738,630 B2 | 5/2004 | Ashmore |
| 6,772,267 B2 | 8/2004 | Thaler et al. |
| 2002/0015403 A1 | 2/2002 | McConnell et al. |
| 2002/0029189 A1 | 3/2002 | Titus et al. |
| 2002/0112014 A1 | 8/2002 | Bennett et al. |
| 2002/0167909 A1 | 11/2002 | Balazinski et al. |
| 2003/0040300 A1 | 2/2003 | LeBodic et al. |
| 2003/0083078 A1 | 5/2003 | Allison et al. |
| 2003/0118027 A1 | 6/2003 | Lee et al. |
| 2003/0158902 A1 | 8/2003 | Volach |
| 2003/0193967 A1 | 10/2003 | Fenton et al. |
| 2003/0202521 A1 | 10/2003 | Havinis et al. |
| 2004/0032856 A1 | 2/2004 | Sandstrom |
| 2004/0156495 A1 | 8/2004 | Chava et al. |
| 2005/0186969 A1* | 8/2005 | Lohtia .............. 455/456.3 |

FOREIGN PATENT DOCUMENTS

| | | |
|---|---|---|
| EP | 0 959 600 A1 | 4/1999 |
| WO | WO 97/20442 | 6/1997 |
| WO | WO 97/36434 | 10/1997 |
| WO | WO 99/11078 | 3/1999 |
| WO | WO 99/33226 | 7/1999 |
| WO | WO 00/41533 | 7/2000 |
| WO | WO 02/25875 A1 | 3/2002 |

* cited by examiner

ARCHITECTURE AND METHODS FOR INTER-CARRIER MULTI-MEDIA MESSAGING

BACKGROUND

1. Field of the Invention

The present invention relates generally to Multi-Media Messaging (MMS) and more particularly to systems and methods for enabling cross-carrier communication via MMS.

2. Background of the Invention

Multi-Media Messaging is viewed by Operators and End Users as the "next generation" of messaging. Users may attach images, graphics, video, and audio to the message in addition to text. Today MMS is still viewed as "picture messaging;" however, there have been increased usage of audio and video in addition to images and text in MMS messages.

As MMS has been rolled out by carriers throughout the world as well as in North America, the deployment has always been within the carrier's own network first, then with connectivity to other carriers. The methodology used has been direct connections—that is, each pair of carriers connect to each other. Direct connections are practical if there are only two or three carriers seeking to exchange MMS. However, if more carriers are involved, the economies of scale start to wane. In several European countries, where there are only two or three carriers, direct peer-to-peer interconnection over MM4 for MMS interoperability has operated relatively smoothly.

Notwithstanding this smooth operation, one of the major problems with this arrangement is that there is no impartial third-party to mediate connectivity between competitive carriers. In the past, the deployment of interoperability has been delayed, which sometimes frustrates carriers who may be further along in their service offering than other carriers. In addition, some European carriers have reported that establishing smooth interoperability is resource-intensive to set up and maintain, especially when there is more than one peer carrier.

Each time a carrier sets up direct connections with another carrier, additional resources, time, and money must be expended. Given that multiple carriers must coordinate their launch plans, agree on any settlement plans, provide for Network Operation Center (NOC) operations and support coordination and their own technical interoperability issues between carriers, it is not surprising that it takes significantly longer for two or more carriers to launch cross-carrier services than it does for each of them to separately connect to an inter-carrier intermediary.

When two or more carriers connect to each other, there is the potential for competitive carriers to have some level of visibility into the other's operations—either positive or negative of other directly connected carriers. For example, if one carrier experiences problems or downtime, those issues may be visible to competitors. Directly connected networks also offer opportunities for unsolicited SPAM. In addition, some carriers may opt to send MM message traffic to others' networks via the MM3 interface, which could further open the possibility of SPAM.

A Global Roaming Exchange (GRX) Provider connection is a logical alternative if all of the participants are GSM carriers. However, in order to make MMS interoperability work, the GRX provider must also deploy specific routing and MM4 relay services. Furthermore, the GRX provider must interact with any local number portability requirements. A GRX provider's purpose is to establish a connection between multiple General Packet Radio Service (GPRS) networks enabling subscribers to roam from one network to another and handling the billing settlement. It is essentially a transport provider. Carriers must still negotiate and provide "direct connections" to each other, but through the GRX, rather than direct connections (either with a VPN or private circuit).

The GSM Association's IR.52 document: "MMS Interworking Guidelines" recommends the GRX as the model of choice for MMS Interoperability. In the document, one argument is raised that GRX would be better than using the public internet to relay MMS traffic between operators; however, it can be shown that in actuality, the level of security provided by the GRX is comparable with using Secure VPNs or private circuits over the Internet. Furthermore, each carrier connected must make sure that all security holes are closed from their MMSCs. One key advantage of using secure VPNs over the GRX is that the GRX recommendations require much more substantial network management resources, resulting in greater start-up and ongoing costs.

In North America, SMS has been a model medium for wireless communications. The successes over the last several years exemplify how a new technology should be introduced, then built upon, in the wireless marketplace. By understanding many of the lessons of SMS, the next wireless messaging technology can play a central role in adding to the Average Revenue Per Unit (ARPU) of wireless operators.

Intermediaries operating between carriers to facilitate interoperability of SMS messages are described in U.S. Ser. No. 10/426,662, filed May 1, 2003 and entitled "Systems and Methods for Interconnecting Heterogeneous Networks", and U.S. Ser. No. 10/831,329, filed Apr. 26, 2004 and entitled "An Intermediary Network System and Method for Facilitating Message Exchange Between Wireless Networks", both of which are incorporated herein by reference.

In the highly competitive landscape of the wireless industry, it is important for carriers to be able to confidentially execute their network operations. One of the hallmarks of a MMS Interoperability intermediary service is the ability to keep confidential information just that—confidential. For example, if one carrier experiences network trouble, that fact is isolated from all other connected carriers. Traffic affecting results and issues should be mediated and isolated from other carriers.

With a connection to a specialized intermediary, carriers can establish and work within their own schedules and support for inter-carrier MMS. Deployment and launch schedules are coordinated with a single source, dedicated to ensuring their customers are able launch services to subscribers quickly. Furthermore, since the intermediary is impartial, messages may be delivered as SMS notifications to other carriers, who are not yet connected to the MMS interoperability ecosystem. The recipients may retrieve the messages from a neutral hosted Web portal or WAP portal, without regard to carrier.

An intermediary normally charges a small fixed per message charge or a sliding scale of charges, depending upon volume. Charges typically account for less than 5-10% of retail pricing, thereby providing a cost effective alternative to in-house solutions. Intermediaries also provide value-added services such as traffic monitoring, inter-network filtering and transcoding, and 24×7 NOC coverage.

BRIEF SUMMARY OF THE INVENTION

The present invention addresses inter-carrier or cross-carrier interoperability for Multi-Media Messaging (MMS) and more particularly to systems and methods for enabling cross-carrier communication via MMS. An intermediary solution offers a number of value-adds that neither direct peer-to-peer nor GRX providers can provide, including routing messages via SMS to carriers that are not directly connected, message retrieval, and services such as traffic analysis and visualization software.

In one aspect of the present invention, a method for providing multimedia message service (MMS) interoperability among a plurality of carriers is provided. The method includes receiving an MMS message from an originating carrier, the MMS message being intended for delivery to a recipient subscriber of a destination carrier, and processing the MMS message for value-added functionality, where the processing includes querying a carrier profile repository to access a carrier profile for the destination carrier, the carrier profile including information regarding whether or not the destination carrier is a connected MMS customer. If the destination carrier is a connected MMS customer, the MMS message is sent to the destination carrier, and if the destination carrier is not a connected MMS customer, the MMS message is stored for a specified period of time during which time the MMS message is available for viewing on an anonymous retrieval portal, and a notification message is sent to the destination carrier to notify the recipient subscriber of the MMS message.

In another aspect, a method for providing multimedia message service (MMS) interoperability among a plurality of carriers is provided. The method includes receiving an MMS message from an originating carrier, where the MMS message is intended for delivery to a plurality of recipient subscribers, and processing the MMS message for value-added functionality, where the processing includes querying a number portability database to determine an identity of a destination carrier for each recipient subscriber. If a destination carrier for a particular recipient subscriber is the same as the originating carrier, then the MMS message is not forwarded back to the originating carrier, and if a destination carrier for a particular recipient subscriber is different from the originating carrier, the MMS message is forwarded to that destination carrier for delivery and is stored for a specified period of time.

In a further aspect of the present invention, an intermediary system for providing multimedia message service (MMS) interoperability between a plurality of carriers is provided that includes a routing subsystem, a number portability database, and a carrier profile repository. The number portability database is in communication with the routing subsystem and is configured to determine the identity of a destination carrier to which the MMS message is intended to be sent. The carrier profile repository is also in communication with the routing subsystem and is configured to access a previously-stored carrier profile for the destination carrier, the carrier profile including information regarding an MMS format acceptable to the destination carrier, and information regarding whether or not the destination carrier is a connected MMS customer. The routing subsystem comprises means for receiving an MMS message from an originating carrier, and is configured to determine, based on the carrier profile, whether to process the MMS message for value-added functionality before notifying the destination carrier of the MMS message.

The foregoing and other features of the present invention and their attendant advantages will be more fully appreciated upon a reading of the following detailed description in conjunction with the associated drawings.

DETAILED DESCRIPTION OF THE INVENTION

Figure 1:
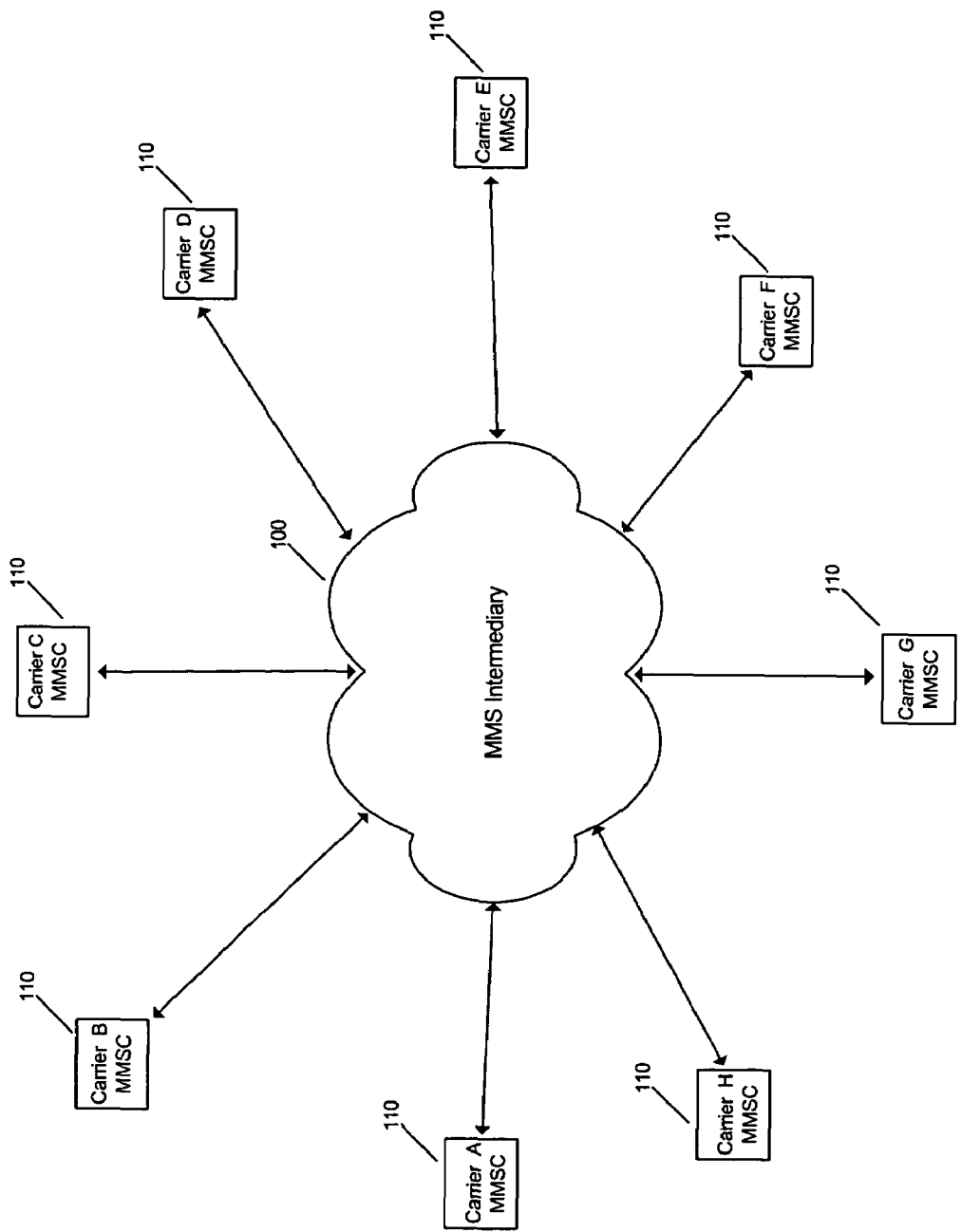
FIG. 1 is a schematic diagram of an inter-carrier MMS Intermediary in communication with multiple MMSCs according to an exemplary embodiment of the invention.

Before an embodiment of the invention is described in detail, one skilled in the art will appreciate that the invention is not limited in its application to the details of construction, the arrangement of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

The acronyms listed and defined in the table below are used throughout the following description:

| | |
|---|---|
| 3GPP | Third Generation Partnership Project |
| ANSI | American National Standards Institute |
| ARPU | Average Revenue Per Unit |
| CD | Carrier Database |
| CDMA | Code Division Multiple Access |
| CP | Carrier Profile |
| EMS | Enhanced Messaging Service |
| FCC | Federal Communication Commission |
| GPRS | General Packet Radio Service |
| GRX | Global Roaming Exchange |
| GSM | Global System for Mobile Communications |
| HTTP | Hyper Text Transmission Protocol |
| MM | Multi-media |
| MMS | Multi-media Messaging Service |
| MMSC | Multi-media Message Service Center |
| MS | Mobile Subscriber |
| NOC | Network Operation Center |
| NP | Number Portability |
| NPDB | Number Portability Database |
| SMPP | Short Message Peer to Peer Protocol |
| SMS | Short Message Service |
| SMSC | Short Message Service Center |
| UA | User Agent |
| VPN | Virtual Private Network |
| WAP | Wireless Access Protocol |
| WNP | Wireless Number Portability |

In an embodiment of the present invention, an independent MMS service network and system (hereinafter called "MMS Intermediary" or simply "Intermediary") exists as a separate entity from the wireless carriers (or wireless operators) it serves. As such, the Intermediary is able to provide a number of value-added services and capabilities that enables carriers to deploy MMS interoperability quickly and reliably, and isolating competitive carriers from each other. It is ultimately up to the destination carrier, once the message arrives from the Intermediary, to deliver the message to the recipient subscriber.

The Intermediary system and method is designed so that it may include a number of extensible, value-added capabilities to provide additional commercial and technical functionality such as pre-delivery transcoding and filtering, additional message content (e.g. anti-spam or adult filtering), and creation of specialized billing records. The intermediary model architecture is specifically tailored to optimize the providing of inter-carrier MMS messaging by providing intermediate storage and queues and then performing various operations on the media components as required by the various value-added extensions.

FIG. 1 presents a diagram illustrating one exemplary implementation of a system in accordance with the invention. The invention provides a flexible Intermediary 100 that interconnects multiple wireless carriers' Multimedia Message Center (MMSC) gateways 110, directly or indirectly, through other service providers, for the purpose of message exchange. As can be seen in FIG. 1, the MMSCs 110 of Carriers A, B, C, D, E, F, G and H each communicate only with the Intermediary 100, and therefore the inter-carrier network has an overall "star" or "spoke" architecture. The wireless carriers can be North American wireless (+1 country code) or international wireless (non +1 country code) carriers.

Despite agreements among vendors with respect to standards, nuances or differences inevitably arise in actual implementations of different vendors' MMSC platforms. These vendor nuances or differences (relating to, as an example, specific MM 4 support) are then magnified by each carrier's own unique implementation of a vendor's MMSC platform within a carrier's network (involving, as an example, acceptable message size, image type, etc.). These factors, in the end, yield a significant inter-carrier or cross-carrier interoperability challenge—e.g., a first carrier's MMSC implementation may likely face a not-insignificant set of interoperability issues when trying to communicate with a second carrier's MMSC implementation. The problem comes to a head when a single message has multiple recipients, each on a different carrier with a different MMSC implementation.

Because MMS messages convey message payloads containing information of a kind well beyond simple text, the interoperability challenges become substantive. Enabling universal access to multimedia content is important for the success of MMS. Without good interoperability, the user experience will be nullified. For example, if a picture is sent via MMS, the user desires that it look exactly as it did when sent, and if it does not, the user is less likely to send an MMS picture again. The same applies to sound and video.

Messages can optionally be delivered to the destination carrier as a legacy message, in situations where certain media types are not supported by the carrier. This capability enables the Intermediary to provide a greater capability of delivery that would otherwise be possible in direct-connection scenarios. For example, transcoding or other methods may be used to adapt an MMS message to a media type supported by the recipient carrier, such as by removing color or depth from an image.

Figure 2:
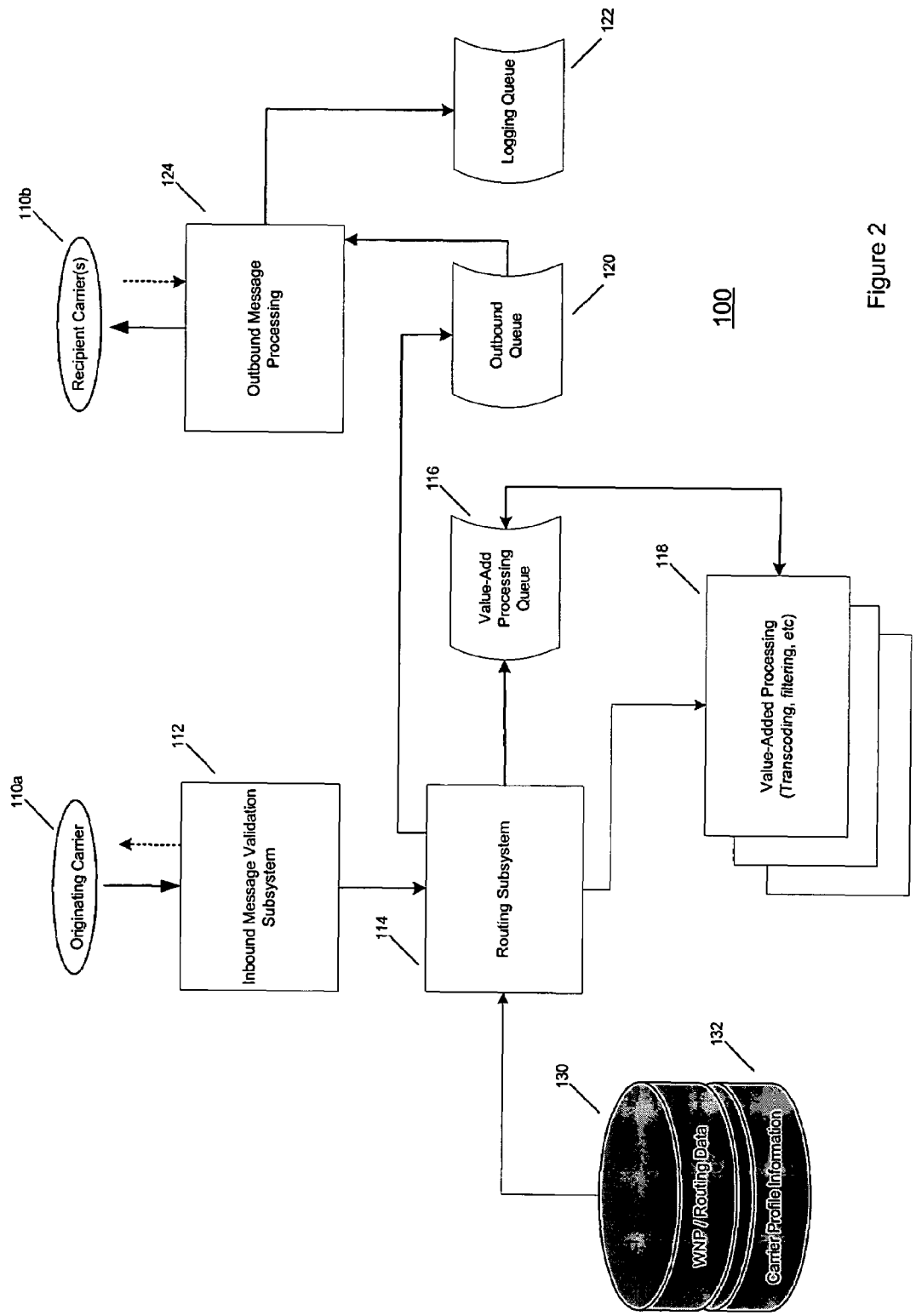
FIG. 2 is a process flow diagram that shows message flow within an inter-carrier MMS Intermediary according to an exemplary embodiment of the invention.

As seen in FIG. 2, the inter-carrier MMS Intermediary Service Platform 100 contains a number of processes through which messages flow before they are delivered to the destination carrier(s) 110b. An MMS message is received from an originating carrier 110a by an Inbound Message Validation Subsystem 112 and directed to a Routing Subsystem 114, which appropriately processes the message before sending it to an Outbound Queue 120 and to an Outbound Message Processing System 124.

In one possible implementation, the Intermediary Service Platform 100 is a facility that is itself encompassed within an intermediary facility like that described in U.S. Ser. No. 10/426,662, filed May 1, 2003 and entitled "Systems and Methods for Interconnecting Heterogeneous Networks", and U.S. Ser. No. 10/831,329, filed Apr. 26, 2004 and entitled "An Intermediary Network System and Method for Facilitating Message Exchange Between Wireless Networks", both of which are incorporated herein by reference.

The Routing Subsystem 114 comprises means for receiving an MMS message from an originating carrier 110a, and is in communication with a Wireless Number Portability (WNP) database 130 and a Carrier Profile (CP) repository 132. The Intermediary 100 queries the Number Portability database 130 to authoritatively determine the identity of the carrier that is currently associated with (i.e., currently services) the address identified as a destination of the MMS message. The identity of the destination carrier 110b is returned.

The Intermediary 100 then queries the Carrier Profile (CP) repository 132 for the CP of the destination carrier 110b, and the CP is returned. A carrier profile is a highly flexible, easily extensible hierarchy of definitional information that is specific to, or applicable to, a given carrier. Exemplary information stored within a carrier profile includes, but is not limited to, information regarding whether or not the destination carrier is a connected MMS customer of the Intermediary, and information regarding an MMS format acceptable to the destination carrier. Each carrier that is connected to the inter-carrier MMS intermediary platform is assigned a specific profile. The profile provides a flexible configuration capability so that the message traffic from and to each carrier may be customized—as each connected carrier has multiple requirements.

Carrier profiles (CPs) are stored within an appropriate back-end repository. Those skilled in the art will appreciate that there could be multiple entries for each of the different "levels" up and down the hierarchy, and that implementation of an Intermediary's CP repository loading/update process may include any number of channels or avenues, including manual (e.g., through command-line utilities or a Web-based user interface) and automatic (e.g., the programmatic exchange of data files or an on-line/real-time data feed), involving both the Intermediary and the involved carriers.

At this point, the MMS message is examined vis-à-vis the returned CP and a series of processing decisions are dynamically made. The routing unit 114 is configured to determine, based on the carrier profile, content of the MMS message received from the originating carrier, and the format of the MMS message, whether to process the MMS message for value-added functionality before notifying the destination carrier of the MMS message. The Intermediary's architecture is specifically tailored to optimize providing inter-carrier MMS messaging by providing intermediate storage and queues and then performing various operations on the media components as required by various value-added extensions.

Through examination of the destination carrier's CP, the Intermediary may query whether the destination carrier is able to accept the instant MMS message as-is. If the answer to this inquiry is "yes" then the MMS message may be delivered to the destination carrier's MMSC platform via MM4. If the answer to this inquiry is "no", then the Intermediary may iterate through the entries in the CP (in a defined, for example ranked or weighted, manner), to determine if a transcoding operation is applicable to the current situation. If transcoding is applicable, the Intermediary processes the MMS message and delivers the transcoded MMS message to the destination carrier's MMSC platform via MM4.

Alternatively, or if transcoding is not applicable, a notification message such as an SMS message or e-mail message may be delivered to the destination carrier to inform the intended recipient of the MMS message. The MMS message is kept active in the data store for a specified period of time, for example 72 hours, after which time the message is deleted. The Intermediary hosts an anonymous retrieval portal as an un-branded website, and during the time an MMS message is kept active, it is available for viewing on the anonymous retrieval portal. The intended recipient of the MMS message, using information supplied in the notification message, can log into the anonymous retrieval portal to retrieve and view the MMS message.

Figure 4:
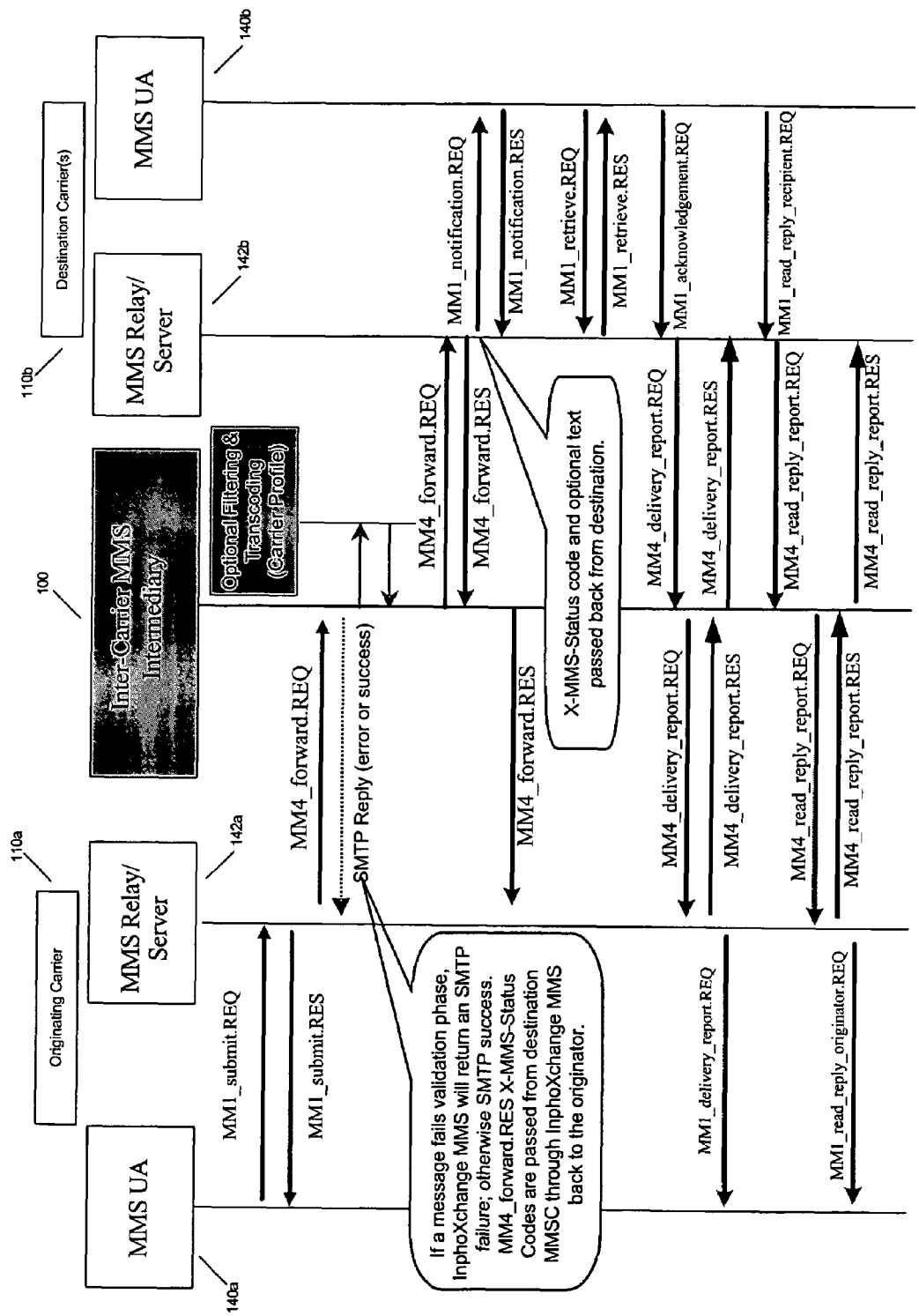
FIG. 4 is a schematic diagram that shows message flow from an originating carrier through the inter-carrier MMS Intermediary to the destination carrier according to an exemplary embodiment of the invention.

The Intermediary also comprises a billing subsystem, that logs and records a Message Detail Record for each successful delivery to a recipient carrier. With reference now to FIG. 4, certain messages result in billable transactions upon successful delivery by the Intermediary, such as:

MM4_forward.REQ successfully delivered to destination as MM4 or SMS notification;
MM4_delivery_report.REQ successfully delivered back to originating MMSC; and
MM4_read_reply_report.REQ successfully delivered back to originating MMSC.

From this description, it can be seen that the Intermediary architecture is designed to include a number of extensible, value-added capabilities that provide additional commercial and technical functionality, such as additional message content (e.g., anti-spam or adult filtering), creation of specialized billing records, and pre-delivery transcoding and filtering like that described in U.S. Ser. No. 10/706,975, filed Nov. 14, 2003 and entitled "System and Method for Providing Configurable, Dynamic Multimedia Message Service Pre-Transcoding", which is incorporated herein by reference.

With reference back to the "star" or "spoke" architecture of the Intermediary 100 together with multiple wireless carriers' MMSC gateways 110, the Intermediary is particularly well-suited to handle MMS messages addressed to multiple recipients subscribing to different destination carriers. For example, instead of an originating carrier attempting to connect with and handle the interoperability issues of multiple destination carriers, the originating carrier need only direct the MMS message to the Intermediary, and the Intermediary will handle delivery of the message to multiple wireless carrier destinations from within the same originating message.

Multimedia messages contain certain standardized address fields, including: From—the address of the originator; To—the destination address(es); and CC—copy address(es). The standardized fields and accepted address formats are defined in the TS 23.140 (Release 5.4) specification from the Third Generation Partnership Project (3GPP), which is incorporated herein by reference. The 3GPP standards for the MM4 interface and protocol also indicate that multiple recipients may be contained in the incoming message. The Intermediary architecture is able to provide delivery of these types of messages in a very configurable and flexible manner.

Figure 3:
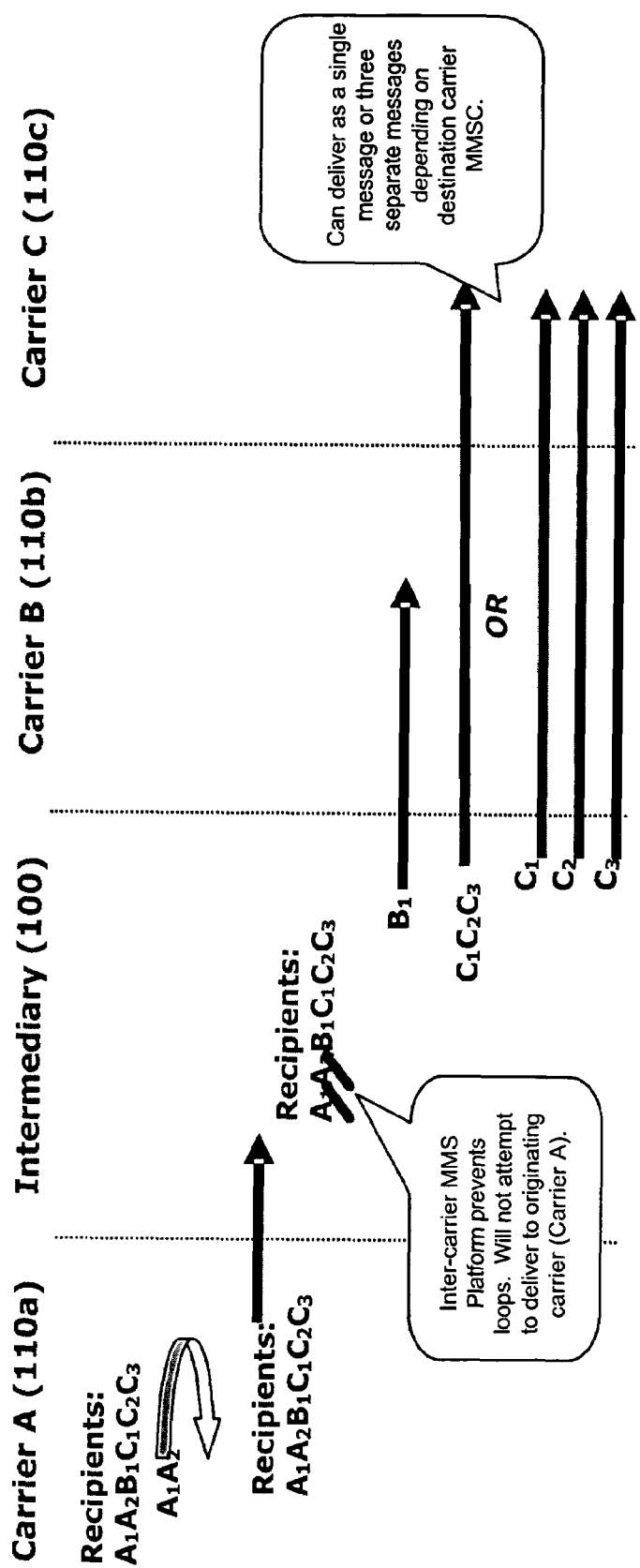
FIG. 3 is a schematic diagram that shows how multiple recipients in a single in-bound message are handled by an inter-carrier MMS Intermediary according to an exemplary embodiment of the invention.

FIG. 3 illustrates how multiple recipients in a single inbound message are handled by the inter-carrier MMS Intermediary. Recipients are identified as A1, A2, B1, C1, C2, and C3. The originating carrier 110a is designated A, and the destination carriers 110a, 110b, 110c are designated as A, B, and C. So, from the single MMS message addressed to six recipients, Carrier A has two messages (A1, A2), Carrier B has one message (B1), and Carrier C has three messages (C1, C2, and C3).

When Carrier A originates the message, the MMSC for Carrier A notes that two of the message are destined for other subscribers on Carrier A, and those messages are delivered by the originating carrier (Carrier A), before the message is forwarded to the inter-carrier MMS Intermediary. The Intermediary scans each destination address and looks up each destination address to determine the destination carrier. The Intermediary platform provides internal routing logic to prevent "loops"—that is, if the destination carrier is the same as the originating carrier, then the MMS message is not forwarded back to the originating carrier, e.g., messages designated A1 and A2 are not forwarded.

If the destination carrier is different from the originating carrier, then the Intermediary queries the Carrier Profile repository for the carrier profile of the destination carrier 110b, 110c. The carrier profile indicates (among other information) if the destination carrier requires a single message per recipient or can handle multiple messages per recipient. The profile also indicates how each carrier will send MMS messages—either as a single message per recipient or multiple messages per recipient, e.g., the MMS message may be sent to a destination carrier (Carrier C) as one message which the destination carrier will deliver to the recipient subscribers (C1, C2, C3), or as separate messages individually addressed to individual recipient subscribers.

Regardless of whether or not a particular recipient's destination carrier is the same or different from the originating carrier, all recipient addresses (including A1 and A2) remain in the message (in either the To or From fields). All the addresses are retained according to TS 23.140 standards, so that the recipient(s) can Reply to All, thus sending a reply to all of the other addressees indicated in the original message's To and CC fields. Under the TS 23.140 standard, it is the responsibility of the Intermediary to ensure that this message integrity is retained.

An exemplary flow of multimedia messages according to TS 23.140 standards is illustrated in FIG. 4. A message from an originating carrier 110a flows from an originating MMS User Agent (UA) 140a, through the inter-carrier MMS Intermediary 100, to a recipient MMS UA 140b. A plurality of interfaces exist to allow communication between various entities in the structure, however this figure depicts only messages on reference points MM1 and MM4.

Reference point MM1 is used to transfer messages and data between a carrier's MMS User Agent 140 and MMS Relay/Server 142. This message/data flow includes submitting Multimedia Messages (MMs) from the MMS UA 140 to the MMS Relay/Server 142, pulling MMs from the MMS Relay/Server 142 to the MMS UA 140, pushing information about MMs from the MMS Relay/Server 142 to the MMS UA 140 as part of an MM notification, and exchanging delivery reports between the MMS Relay/Server 142 and the MMS UA 140.

Reference point MM4 is used to transfer messages and data between the MMS Relay/Server 142 and the MMS Intermediary 100. As a security precaution, the MMS Intermediary 100 will only accept incoming messages on the MM4 interface. The MM3 interface is blocked as an anti-SPAM measure. Both Delivery reports and Read-reply reports are sent to the MMS Intermediary 100 via the MM4 interface by the recipient MMS Relay/Server 142b and recipient MMS UA 140b, respectively.

As seen in FIG. 4, when a mobile subscriber (not shown) sends an MMS message, it is transmitted to the Originator MMS UA 140a, which dispatches an MM1_submit.REQ request message to the Originator MMS Relay/Server 142a. The Originator MMS Relay/Server 142a then issues an MM4_forward.REQ request message to the MMS Intermediary 100, which contains the actual multi-media message to be forwarded, by the MMS Intermediary 100, to the destination carrier 110*b*. The MMS Intermediary 100 receives the MM4_forward.REQ request message, appropriately processes it (including, if applicable, transcoding, filtering, authenticating and routing), and dispatches it to the Recipient MMS Relay/Server 142*b* for delivery.

The MMS Intermediary 100 requires the incoming MM4_forward.REQ request message to include the MM originator of a routed forward MM in the addressing-relevant information field(s) of the message. The MMS Intermediary 100 must have this originator information for billing and tracking; otherwise, it will not forward the message to the destination. If the originator MMS User Agent 140*a* requested to hide its identity from the MM recipient, then the information about this request must also be conveyed in the MM4_forward.REQ delivered to the destination MMSC. It is up to the destination MMSC to "hide the originator" from the recipient.

The MMS Intermediary 100 will request a MM4_forward.RES response message from the destination carrier 110*b*, by default. This enables the originator to gain detailed feedback about the disposition of the message. The message may be rejected by the MMS Intermediary 100, at which point the MM4_forward.RES response message will contain information as to why the message was rejected. The message can be submitted to the destination carrier 110*b*. When the MM4_forward.RES is requested, the destination carrier 110*b* is required to return the disposition status of the message. If the message is rejected, the appropriate 3GPP standards status code will indicate the reason rejected. If the message is successfully accepted by the destination carrier 110*b*, the MM4_forward.RES message will be returned with a "success" status code.

Other messages supported by the MMS Intermediary 100 include:

MM4_delivery_report.REQ/.RES—This message request/response pair is supported only in conjunction with support by the originator and destination carriers. MM4_delivery_report.REQ will only be delivered to the originator MMSC, if the originating MMSC is from a valid MMS-connected carrier. These messages will not be delivered as a SMS notification.

MM4_read_reply_report.REQ/.RES—Supported only in conjunction with supported carrier. The MM4_read_reply_report.REQ will only be delivered back to the originator MMSC, if the originating MMSC is from a valid MMS-connected carrier. These messages will not be delivered as a SMS notification.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for providing multimedia message service (MMS) interoperability among a plurality of carriers, comprising:

receiving an MMS message from an originating carrier, wherein the MMS message is intended for delivery to a recipient subscriber of a destination carrier;

processing the MMS message for value-added functionality, wherein said processing includes querying a carrier profile repository to access a carrier profile for the destination carrier, the carrier profile including information regarding whether or not the destination carrier is a connected MMS customer and including information regarding an MMS format acceptable to the destination carrier;

if the destination carrier is a connected MMS customer, sending the MMS message to the destination carrier; and if the destination carrier is not a connected MMS customer, storing the MMS message for a specified period of time during which time the MMS message is available for viewing on an anonymous retrieval portal, and sending a notification message to the destination carrier to notify the recipient subscriber of the MMS message.

2. The method of claim 1, wherein the carrier profile repository contains carrier profiles for a plurality of carriers.

3. The method of claim 1, wherein said processing step further comprises transcoding the MMS message in accordance with the carrier profile to generate a transcoded MMS message.

4. The method of claim 1, wherein the MMS message received from the originating carrier is sent to the destination carrier via an MM4 message.

5. The method of claim 1, wherein the notification message is an SMS message.

6. The method of claim 1, wherein the notification message is an e-mail message.

7. The method of claim 1, further comprising querying a number portability database to determine an identity of a destination carrier.

8. The method of claim 1, further comprising billing the originating carrier for delivery of the MMS message or the notification message to a destination carrier.

9. The method of claim 1, further comprising reporting delivery of the MMS message back to the originating carrier.

10. The method of claim 9, wherein said reporting step comprises reporting that the message has been read.

11. The method of claim 9, wherein said reporting step further comprises billing the originating carrier for said reporting.

12. A method for providing multimedia message service (MMS) interoperability among a plurality of carriers, comprising:

receiving an MMS message from an originating carrier, wherein the MMS message is intended for delivery to a plurality of recipient subscribers;

processing the MMS message for value-added functionality, wherein said processing includes querying a number portability database to determine an identity of a destination carrier for each recipient subscriber and further includes querying a carrier profile repository to access a carrier profile for each destination carrier that is different from the originating carrier, wherein the carrier profile includes information regarding an MMS format acceptable to the destination carrier;

if a destination carrier for a particular recipient subscriber is the same as the originating carrier, not forwarding the MMS message to that destination carrier;

if a destination carrier for a particular recipient subscriber is different than the originating carrier, forwarding the MMS message to that destination carrier for delivery and storing the MMS message for a specified period of time.

13. The method of claim 12, further comprising querying a carrier profile repository to access a carrier profile for each destination carrier that is different from the originating carrier, the carrier profile including information regarding whether or not the destination carrier is a connected MMS customer; and if the destination carrier is not a connected MMS customer, storing the MMS message for a specified period of time during which time the MMS message is available for viewing on an anonymous retrieval portal, and sending a notification message to the destination carrier to notify the recipient subscriber of the MMS message.

14. The method of claim 12, wherein said processing step further comprises transcoding the MMS message in accordance with the carrier profile to generate a transcoded MMS message for delivery to the destination carrier.

15. A system for providing multimedia message service (MMS) interoperability between a plurality of carriers, comprising:

a routing subsystem comprising means for receiving an MMS message from an originating carrier;

a number portability database, in communication with the routing subsystem and configured to determine the identity of a destination carrier to which the MMS message is intended to be sent;

a carrier profile repository, also in communication with the routing subsystem and configured to access a previously-stored carrier profile for the destination carrier, the carrier profile including information regarding an MMS format acceptable to the destination carrier, and information regarding whether or not the destination carrier is a connected MMS customer;

the routing subsystem configured to determine, based on the carrier profile, content of the MMS message received from the originating carrier, and a format of the MMS message, whether to process the MMS message for value-added functionality before notifying the destination carrier of the MMS message.

\* \* \* \* \*